(12) United States Patent
Brahmbhatt et al.

(10) Patent No.: US 7,840,450 B2
(45) Date of Patent: Nov. 23, 2010

(54) METHOD AND APPARATUS FOR ASSOCIATION OF A RADIO FREQUENCY IDENTIFICATION TAG WITH DIGITAL DATA FOR DISTRIBUTION

(75) Inventors: Deepali Apurva Brahmbhatt, Mountain View, CA (US); John Albert Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1192 days.

(21) Appl. No.: 11/142,921

(22) Filed: Jun. 1, 2005

(65) Prior Publication Data

US 2006/0273908 A1      Dec. 7, 2006

(51) Int. Cl.
    *G06Q 10/00* (2006.01)
    *G06F 17/00* (2006.01)
(52) U.S. Cl. .................. 705/28; 328/115; 707/661; 707/736
(58) Field of Classification Search ............... 705/28
    See application file for complete search history.

(56) References Cited

U.S. PATENT DOCUMENTS

| | | | |
|---|---|---|---|
| 7,707,037 B2* | 4/2010 | Claudatos et al. | 704/275 |
| 2002/0185532 A1* | 12/2002 | Berquist et al. | 235/385 |
| 2003/0227392 A1* | 12/2003 | Ebert et al. | 340/825.49 |
| 2004/0156535 A1* | 8/2004 | Goldberg et al. | 382/115 |
| 2005/0143126 A1* | 6/2005 | Chipchase | 455/557 |

OTHER PUBLICATIONS

BluePay™ System, Blueshift Technologies Ltd., [Internet] http://www.blueshiftech.com/Products_f/BluePay.pdf., 3 pages, printed Aug. 25, 2005.
"Nokia 5140 FRID Reader", [Internet] http://mobilemag.com/content/100/104/C607, 1 page, Mar. 17, 2004, printed Aug. 25, 2005.
"RFID News Roundup," *RFID Journal*, [Internet] http://www.rfidjournal./article/articleprint/917/1/1, 2 pages, Apr. 23, 2004, printed Aug. 25, 2005.
"Indy 500 Keeps Score with RFID", *RFID Journal*, [Internet] http://www.rfidjournal./article/articleprint/965/-1/1, 3 pages, May 31, 2004, printed Aug. 25, 2005.
"The card up their sleeve", *The Guardian*, [Internet] http://www.guardian.co.uk/weekend/story/0,03605,999866,00.html, 11 pages, Jul. 19, 2003, printed Aug. 25, 2005.

* cited by examiner

*Primary Examiner*—F. Ryan Zeender
*Assistant Examiner*—Faris Almatrahi
(74) *Attorney, Agent, or Firm*—Patterson & Sheridan, LLP

(57) ABSTRACT

A system for storing and retrieving data associated with an identification of a RFID device. The invention receives data and a list of RFIDs associated with data. The system then stores the data in a memory and stores a record of an association by the data and each RFID. When the system receives a request for data that includes a RFID, the system searches for records of the associations and presents the data associated with the received RFID.

18 Claims, 10 Drawing Sheets

METHOD AND APPARATUS FOR ASSOCIATION OF A RADIO FREQUENCY IDENTIFICATION TAG WITH DIGITAL DATA FOR DISTRIBUTION

FIELD OF THE INVENTION

This invention relates to Radio Frequency Identification (RFID) tags. More particularly, this invention relates associating digital data with RFID tags. Still more particularly, this invention relates to the use of an association of an RFID tag with digital data stored in a memory to retrieve the digital data for a user based upon the RFID.

PRIOR ART

One new method of tracking objects in a given area is Radio Frequency Identification (RFID). In an RFID system, an RFID device commonly referred to as a RFID tag is affixed to an object. The RFID device then either periodically transmits RF signals giving identification information or transmits the information when an interrogation RF signal is received. A reader then receives the RF signals and can determine the objects in the area from the information received from RFID devices within range of the reader.

As technology has increased the quality of digital images and decreased the cost of digital imaging devices, such as digital cameras, it has become common to monitor a location by capturing images of the area. Thus, there is a need in the art for an ability to relate RFID information received for an area with a digital image of an area to accurately identify objects shown in the image. Preferably, this information could be communicated in one file in an existing format so that the files could be used by existing devices and software.

One use for such technology is to provide digital images captured of patrons of an amusement park or ceremony based upon an RFID tag the patron is carrying and/or wearing. Thus, a further problem is how to provide the digital images or other data to a person based upon the RFID of the RFID tag the person is wearing and/or carrying.

SUMMARY OF THE INVENTION

The above and other problems are solved and an advance in the art is made by the system for storing and providing data based upon an RFID in accordance with this invention. This invention provides a method of storing digital data and an association of the data with an RFID. The RFID may then be used to retrieve all stored data associated with the RFID. This provides an efficient method for providing data that is associated with an RFID to a user to input an RFID.

In accordance with this invention, an archiving system archives and retrieves data associated with at least one identification of a Radio Frequency Identification (RFID) device in the following manner. The archive system receives data associated with at least one RFID device from another system connected by a network. The archive system, also receives a list of identifications of RFID devices that are associated with the received data. The data is then stored in a memory by the archive system. Then the archive system stores an association between the data and each identification in the list.

In some embodiments in accordance with this inventions the data and list are received in a file that has the data in a data potion and the list in a meta data portion of the file. In these embodiments, the list is read from the meta data and the file is stored to memory by the archive system.

In some exemplary embodiments in accordance with this invention, each identification of the RFID device is stored in a data record and the association with data is added to the record for each identification associated with data.

Data is retrieved by the archive system in accordance with this invention in the following manner. The archive system receives a request for data associated with an identification of an RFID device. The archive system then retrieves each association between the identification and data. A list of data associated with the identification is provided by the archive system. The archive system may then provide the list for the user or retrieve all the data associated with the identification.

BRIEF DESCRIPTION OF THE DRAWINGS

The above and other features and advantages of this invention are described in the following description and are shown in the following drawings.

DETAILED DESCRIPTION

This invention relates to a system for storing data and associations of the data with identifications of RFID devices. The following exemplary embodiments are meant to enable one skilled in the art to operate a system for storing the data and associations in accordance with this invention.

In accordance with this invention, an archive system is provided that stores data and the associations between the data and identifications of RFID devices. For purposes of this discussion, the data is digital data that may be stored and read by a processing unit. However, it is envisioned the same methods may be used for other types of data provided the system supports the data type being used.

Figure 1:
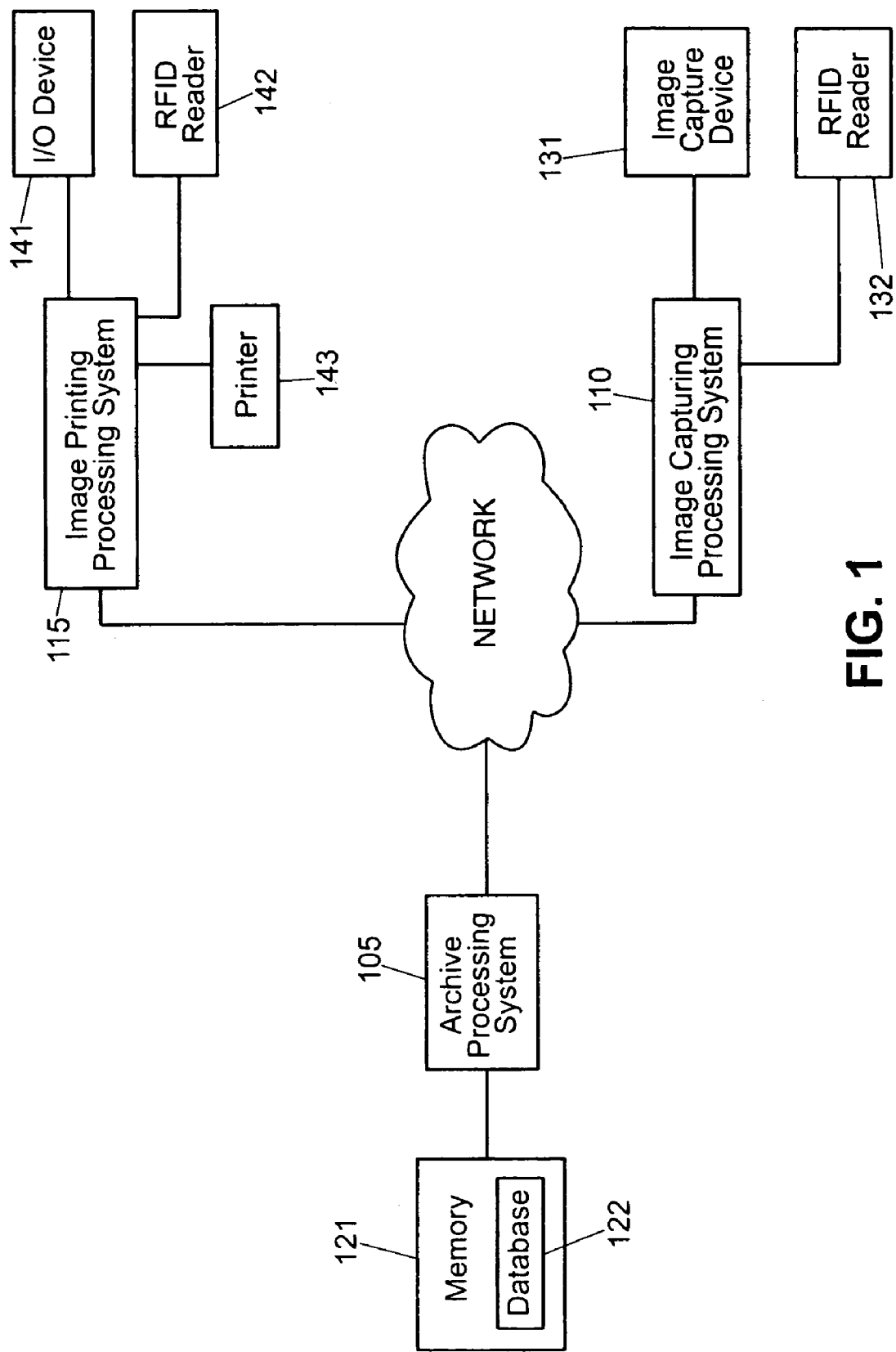
FIG. 1 illustrating a network that implements a system in accordance with this invention.

FIG. 1 illustrates network 100 that includes archive system 105 in accordance with this invention. For simplicity of this discussion three processing systems are shown connected to network 100. The processing systems include archive system 100, image capturing system 110 and image printing system 115. One skilled in the art will recognize that any number of processing systems may be connected to network 100 depending on the capacity of network 100. Furthermore, a processing system connected to network 100 may perform more than one operation shown as executed on a separate system. Still furthermore, although the exemplary embodiments are illustrated manipulating image data, it is envisioned that this invention may be used with other types of data that may be associated with identifications of RFID. Some other examples of data that may be associated with an RFID include purchases of items, admittance to attractions, and other recordings of the user.

Network 100 is a network such as a Local Area Network (LAN), a Wide Area Network, or the internet that connect processing systems to allow systems to exchange data with other connected processing systems. One skilled in the art will recognize that systems 105, 110 and 115 may be connected in any matter to the network as the connection is not important to implementing the system in accordance with this invention. Types of connections include, but are not limited to, a convention telephonic connection, a wireless connection, or Ethernet connection.

Archive system 105 is a processing system that receives data and identification of RFID devices associated with the invention. The archive system includes a memory 121 for storing the data. In some embodiments, memory 121 may include a memory and processes executed by the processing system of archive system 105 for managing the storage of data in the memory. Archive system 105 may also manage a system such as database 122 in memory 121 for storing associations between the data stored in memory 121 and identifications of RFID devices.

In this exemplary embodiment, data capture system 110 is a device that captures data and identification of RFID devices and transmits the captured data and associations of identifications over network 100 to archive system 105. Data capture system 110 includes an image capture device 131, such as a digital camera for generating the digital data to be transmitted. An RFID reader connected to data capture system 110 is located proximate the image capture device 131 to detect RFID device proximate the location of the image captured by the RFID device. One skilled in the art will recognize that more than one RFID reader and/or image capture device may be connected to the data capture system 110. Data capture system 110 also includes hardware, software and/or firmware that performs the capturing of the data and identifications of RFID devices, and the transmission in a proper form of the data and associations over network 100 to archive system 105.

Image printing system 115 is a system that receives data associated with an input identification of a RFID device and provides the data to the user. In this exemplary embodiment, image printing system provides a print of an image captured by image capturing system 110 that has been stored as digital data. Image printing system 115 may include a keyboard or other Input/Output device 141 to allow a user to input an identification. Image printing device may also or alternatively include and RIFD reader 142 which can communicate with an RFID device to receive an identification. Image printing system 115 is connected to network 100 to communicate with Archive system 105 to receive image data associated with an input identification of an RFID device. A printer or other image generate 143 is connected to image printing system 115 to print the image from the received data.

Figure 2:
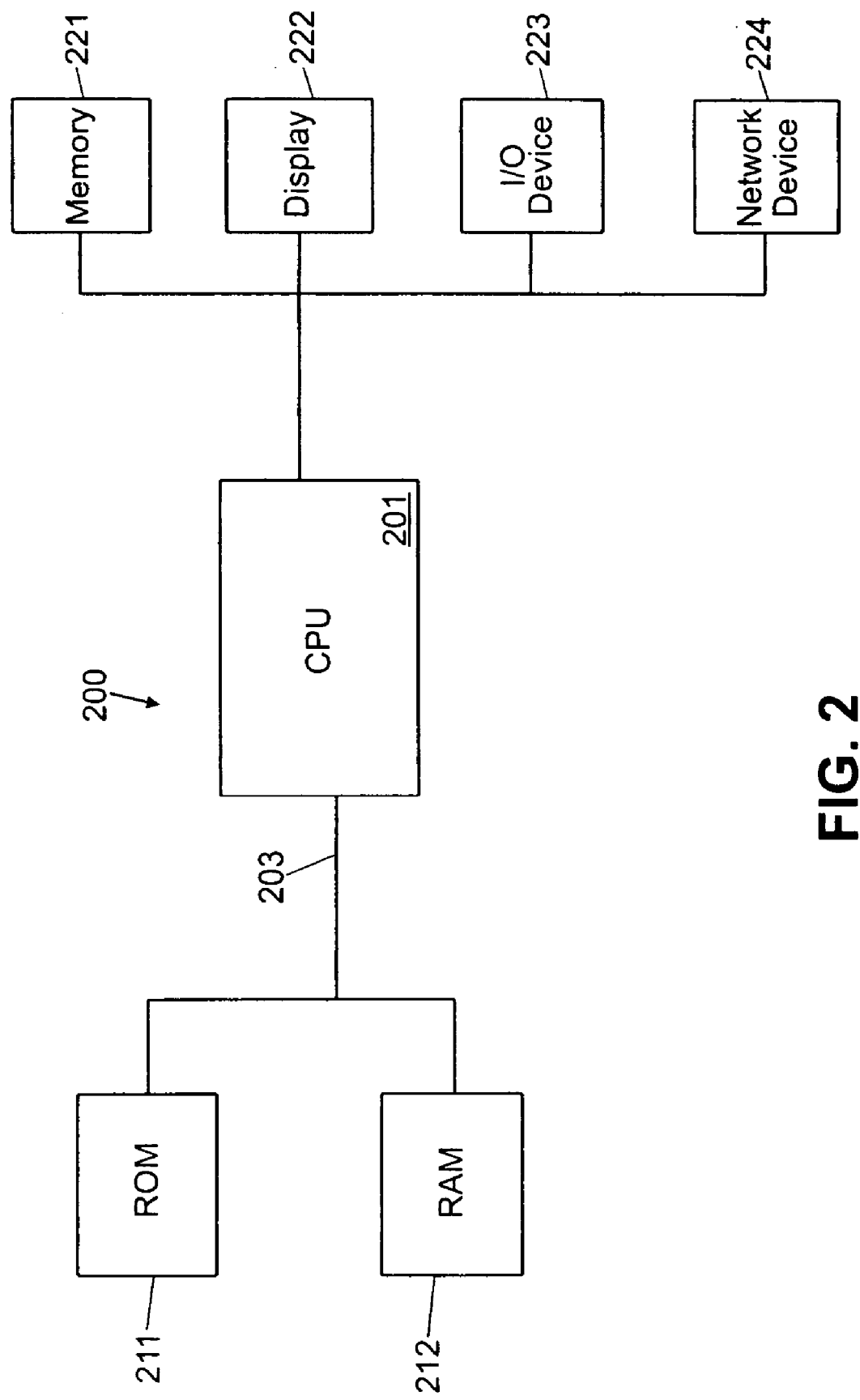
FIG. 2 illustrating an exemplary processing system such as a device connected to the network in accordance with this invention.

FIG. 2 illustrates an exemplary embodiment of a processing system 200. One skilled in the art will recognize that each system 105, 110, and 115 connected to network 100 in FIG. 1 includes a processing system 200. However, the exact configuration and devices connected to the processing system in each individual system in the network may vary depending upon the functions that the processing system performs.

Processing system 200 has a Central Processing Unit (CPU) 201. CPU 201 is a processor, microprocessor, or any combination of processors and/or microprocessors that execute instructions stored in memory to perform an application. CPU 201 is connected to a memory bus 203 and Input/Output (I/O) bus 204.

A non-volatile memory such as Read Only Memory (ROM) 211 is connected to CPU 201 via memory bus 203. ROM 211 stores instructions for initialization and other systems command of processing system 200. One skilled in the art will recognize that any memory that cannot be written to by CPU 201 may be used for the functions of ROM 211.

A volatile memory such as Random Access Memory (RAM) 212 is also connected to CPU 201 via memory bus 204. RAM 212 stores instructions for all processes being executed and data operated upon by the executed processes. One skilled in the art will recognize that other types of memories such DRAM and SRAM may also be used as a volatile memory and that memory caches and other memory devices (not shown) may be connected to memory bus 204.

Peripheral devices including, but not limited to, memory 221, display 222, I/O device 223, and network connection device 224 that are connected to CPU 201 via I/O bus 204. I/O bus 204 carries data between the device and CPU 201. Memory 201 is a device for storing data into a media. Some examples of memory 221 include read/write compact discs (CDs), and magnetic disk drives. Display 222 is a monitor or display and associated drivers that convert data to a display. I/O device 223 is a keyboard, a pointing device or other device that may be used by a user to input data. Network device 224 is a modem or Ethernet "card" that connects processing system 200 to a network 100. One skilled in the art will recognize that exact configuration and devices connected to each processing system in network 100 may vary depending upon the operations that the processing system performs in the network.

Figure 3:
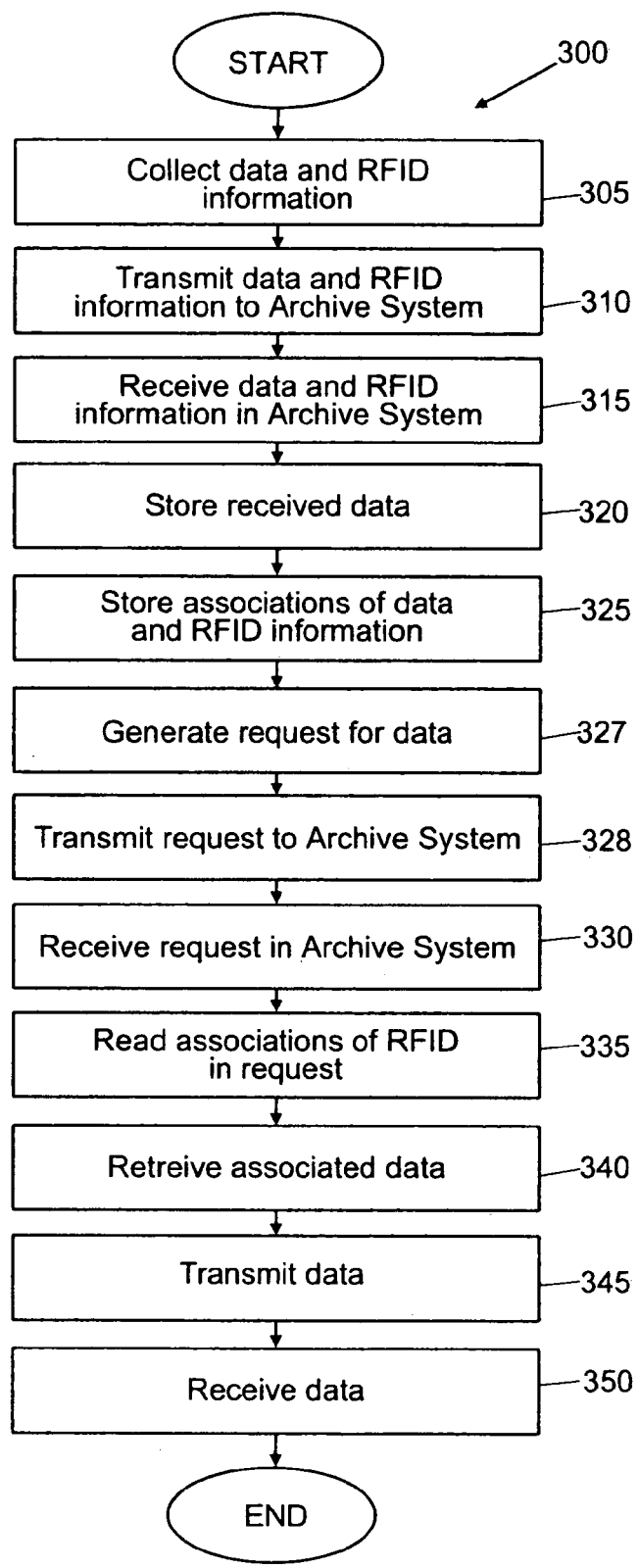
FIG. 3 illustrating process for storing and retrieving data associated with an identification of and RFID device in accordance with this invention.

FIG. 3 illustrates a flow chart of an over view of a process 300 for storing and retrieving data associated with an identification of an RFID device in accordance with this invention. Process 300 begins in step 305 in which a system collects data and identifications of RFID devices associated with the data. The data and identifications of RFID devices are then transmitted to an archive system in step 310. Exemplary embodiments of these steps are described below and illustrated in FIGS. 4-8.

The archive system then receives the data and identifications of RFID devices associated with the data in step 315. In step 320, the archive system stores the received data. The associations of the identification of the RFID and data are stored in step 325. An exemplary embodiment of these steps is described below and illustrated in FIG. 9.

In step 320, a system generates a request for data. The request includes an identification of an RFID device that will be used to retrieve the data. In step 325 the request is transmitted to the archive system. An exemplary embodiment of these steps is described below and illustrated in FIG. 11.

The archive system then receives the request in step 330. The archive system then reads the associations of the identification with data in step 335. The associated data is then read from memory in step 340 and transmitted to the requesting system step 345. An Exemplary process for retrieving data is described below and illustrated in FIG. 10. The requesting system then receives the data in step 350 and process 300 ends.

In order to store and provide data associated with an RFID device. The data must first be associated with identification of an RFID device. The following provide an exemplary embodiment for associating an RFID device with data for a digital image. This embodiment may be used for providing prints of pictures to persons wearing RFID devices at an event or an attraction. One skilled in the art will recognize that other types of data may be associated with an identification of an RFID and the following is only one exemplary embodiment that may utilize this invention.

Figure 4:
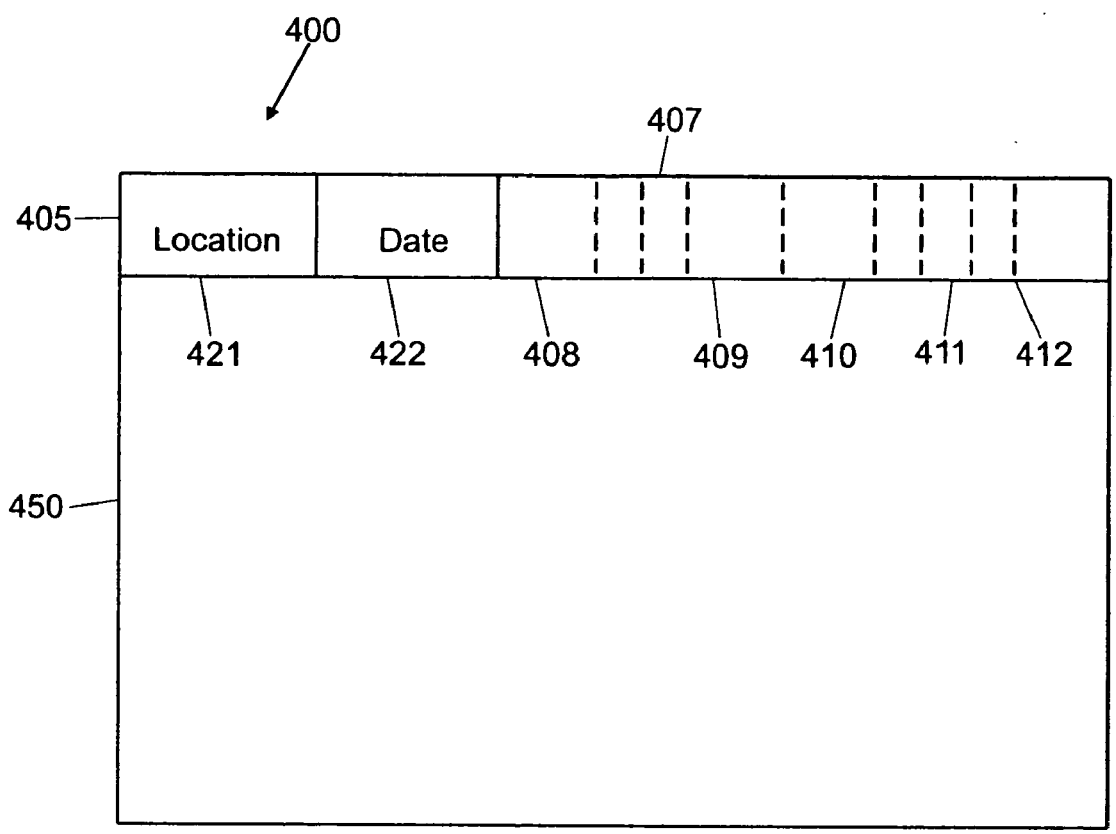
FIG. 4 illustrating a block diagram of data in an exemplary embodiment of a data file for transmitting data and identification of RFID device associated with the data in accordance with this invention.

FIG. 4 illustrates a digital file for storing an image with RFID information to transmit to in accordance with this invention. Data file 400 may be in one of several formats including but not limited to EXIF. Data file 400 includes a meta data portion 405 and an image portion 450. Image portion 450 is the portion of data file 400 that stores information for the image. This information may be stored in any of several formats including JPEG. The exact configuration of that image data is stored may also depend on the format of data file 410.

Meta data portion 405 stores information relating to the image. Such information may include a location field 421, and a date created field 422. Other information may include the device producing the image, a user creating the image, and time of day. One skilled in the art will recognize any number of fields and the type of information stored may be dictated by the format of the file and the information a user wants to store. In accordance with this invention, meta data portion 405 also includes a RFID field 407 that stores information for each RFID device that is proximate the location shown in the image. The RFID field may include a separate sub-field 408-412 for each RFID device. The information for each RFID device may include an identifier of the RFID device, a location of the RFID device in the image, and/or a Global Positioning System (GPS) location of the device.

Figure 8:
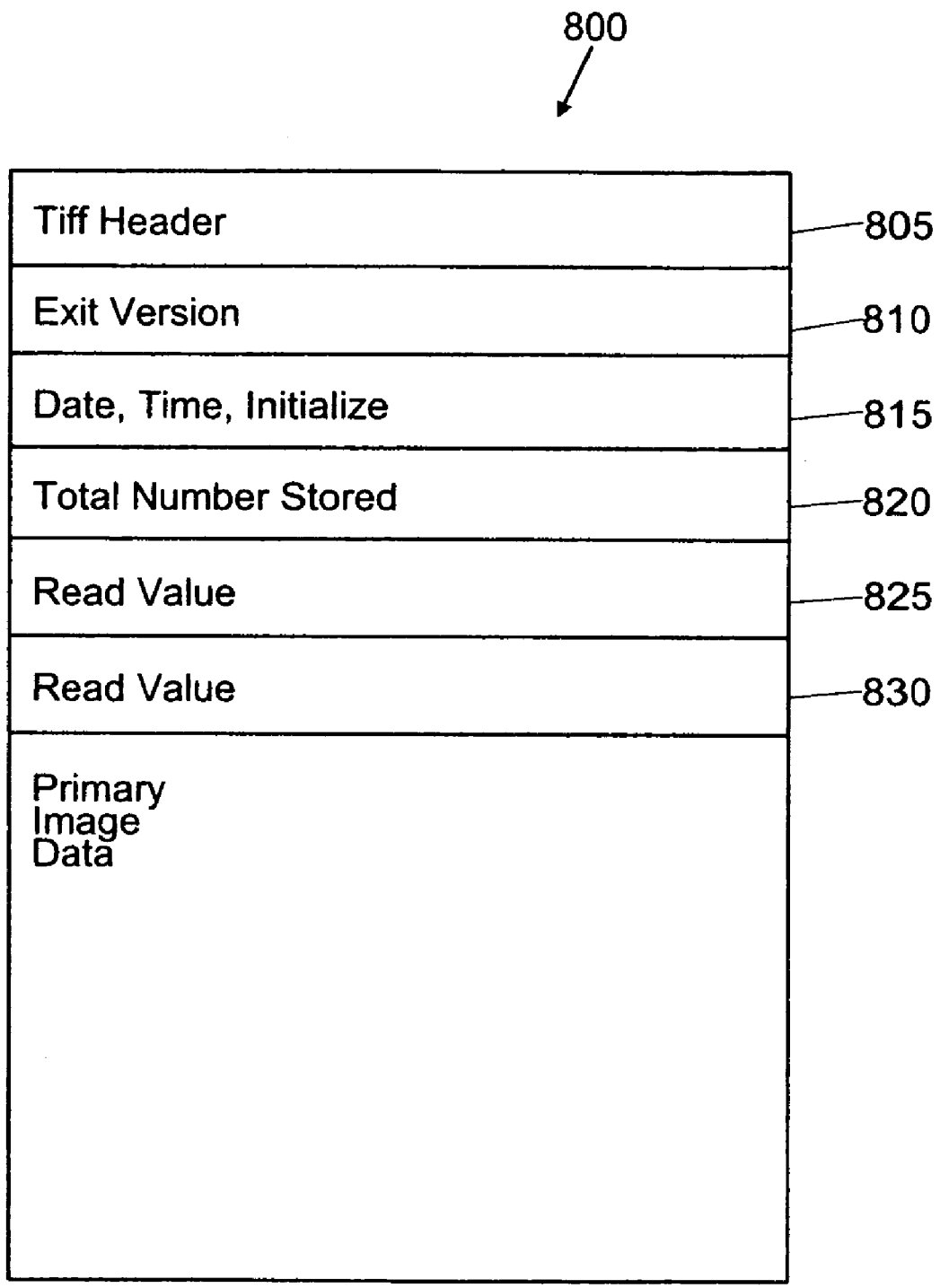
FIG. 8 illustrating a flow diagram of a method performed by a system connected to an archive system for generating and transmitting a data file having data and identification of RFID devices associated with the data in accordance with this invention.

FIG. 8 illustrates a block diagram of the fields in a meta data portion of an image file stored in an EXIF formatted file. Meta data 800 includes a TIFF header 805, EXIF version 810, Date time filed 815, Total number stored field 820, read value 1 field 825, and read value 2 field 830. Tiff header field 805 identifies the image stored in the file. EXIF version field 810 identifies the EXIF version used to format the file. Date, time initialized field 815 stores the date and time the image was created. The total number stored field indicates the total number of images stored in the file. Read value field 825 and 830 store read values for the file.

Figure 5:
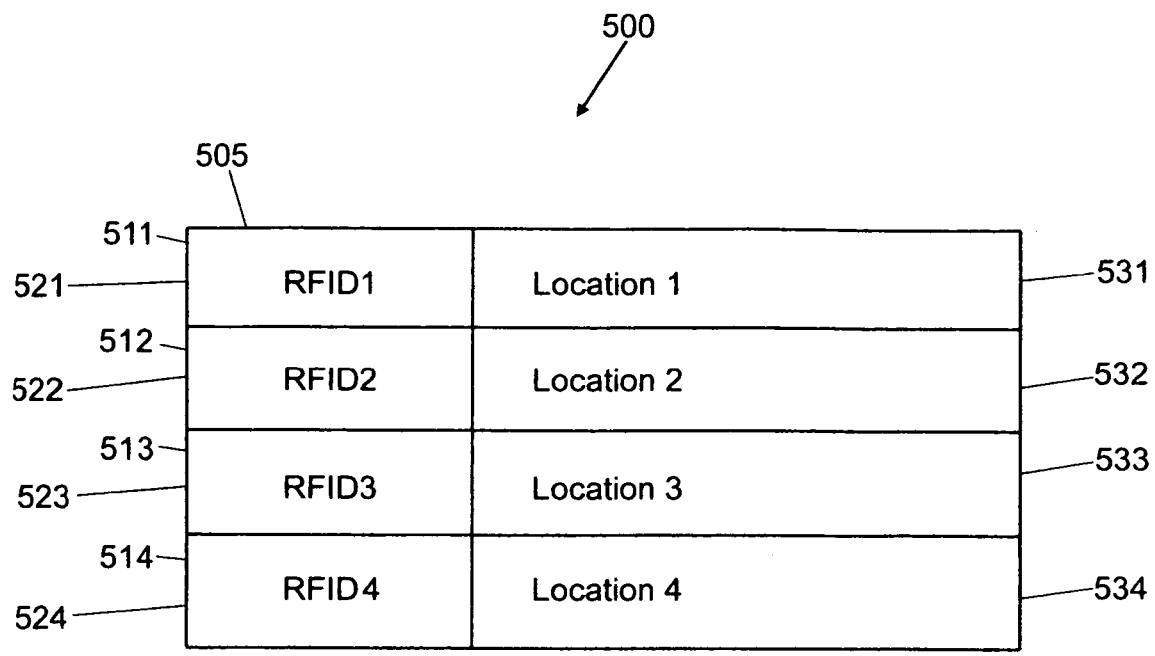
FIG. 5 illustrating an RFID information field in an exemplary embodiment of a meta data portion of a data file for transmitting data and identifications of RFID devices associated with the data in accordance with an exemplary embodiment of this invention.

FIG. 5 illustrates an exemplary embodiment of a meta data portion 500 of a data that includes RFID device information for an image. Meta data portion 500 includes a field 505 that stores RFID device information for each device proximate a location shown in an image. Each sub-field 511-514 stores information for one RFID device. In some embodiments, each sub-field 511-514 may only store an identifier for each RFID device. However, each sub-field may be partitioned to allow different types of information for the identified RFID device. For example, in this embodiment, each sub-field 511-514 may have a first partition 521-524 that stores an identifier and a second partition that stores location information for the device. The location information may be the location of the device in the image or a GPS coordinate for the device.

Figure 6:
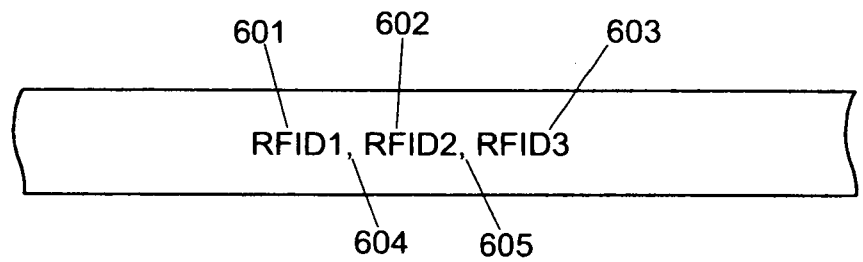
FIG. 6 illustrating a field for storing RFID information in a field in a meta data portion of a data file having an EXIF format for a data file for transmitting data and identifications of RFID devices associated with the data in accordance with an exemplary embodiment of this invention.

FIG. 6 illustrates a miscellaneous field in the meta data of an EXIF format file used to store RFID device information. In this embodiment, only identification data for the RFID device is stored. The identifications 601-603 of each RFID device are stored in ASCII string, each identification is separated by a symbol such as a comma 604-605. One skilled in the art will recognize that other symbols may be used and that other types of formats may be used to represent the RFID device identifiers.

Figure 7:
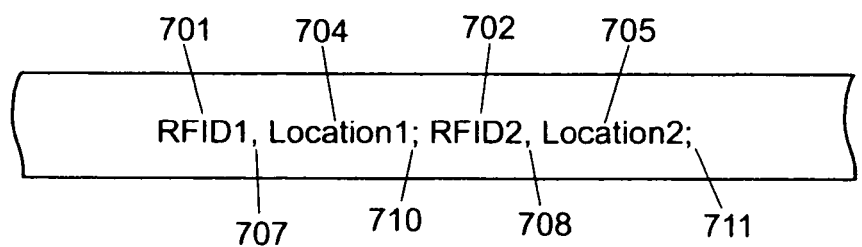
FIG. 7 illustrating a field for storing RFID information in a field in a meta data portion of a data file for transmitting data and identifications of RFID devices associated with the data where the file has an EXIF format in accordance with an exemplary embodiment of this invention.

FIG. 7 illustrates a second embodiment in which information other than the identifier of an RFID device is also stored in the field in the meta data of an EXIF formatted file. In this embodiment, the RFID device information includes an identifier and location information. One skilled in the art will recognize other types of information may be stored with the identifier and the information is not limited to location information. For each RFID device, each RFID device identifier 701-703 is separated from location information 704-706 for the device by a first symbol 707-709, such as a comma. The information for each device is then separated by a second symbol 710-712, such as a semi-colon. One skilled art will recognize that types of information may be further sub-divided by using a third and subsequently different symbols.

Figure 9:
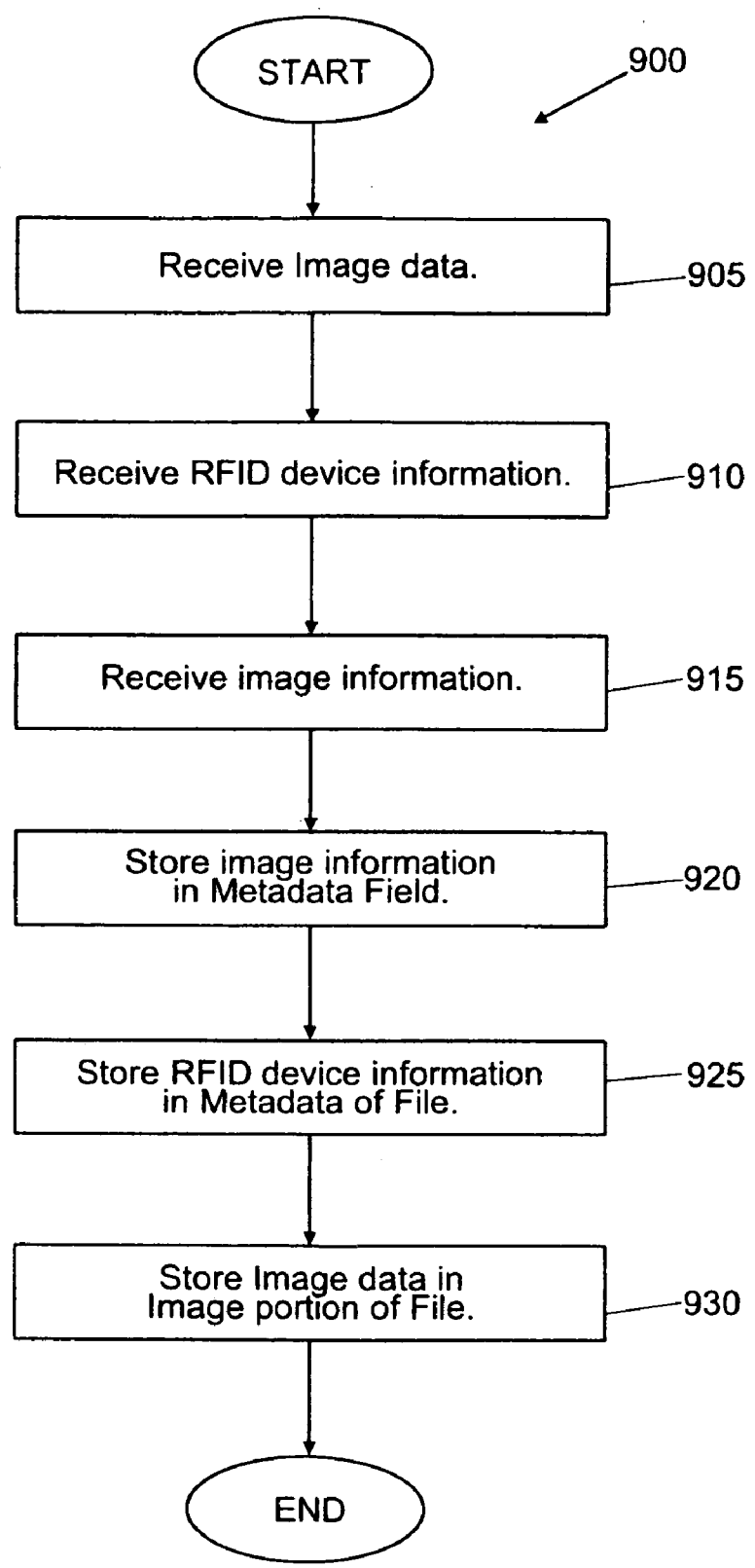
FIG. 9 illustrating a process performed by an archive system for receiving data and identifications of RFID devices associated with the data and storing the data and association with the identification in accordance with an exemplary embodiment of this invention.

FIG. 9 illustrates a method that is performed by software executed by a processing system to generate a file for storing an image with RFID device information in accordance with this invention and transmitting the file to an archive system. Process 900 begins in step 905 by receiving image data for an image. This image data may be data of an image captured by a digital camera or other imaging device and transmitted to the processing system.

In step 910, information for each RFID device proximate the location shown in an image is received. One skilled in the art will recognize that currently there is not a way to limit the RFID device to only those shown in an image. However, the digital file of this invention could be limited to only those RFID devices shown in the image if technology permits. Furthermore, the information for each RFID device proximate the location may be received from an RFID reader. The RFID reader gathering the information by transmitting RF signals and receiving information from each RFID device that receives the RF signals and responds by transmitting RF signals to the RFID reader.

In step 915, image data is stored in the image portion of the data file. In step 925 the information for each RFID device proximate the location shown in the image is stored in the meta data portion of the file. In step 930, other image information is stored in the meta data portion of the file. Process 900 ends in step 935 with the file being transmitted to the archive system over the network.

Figure 10:
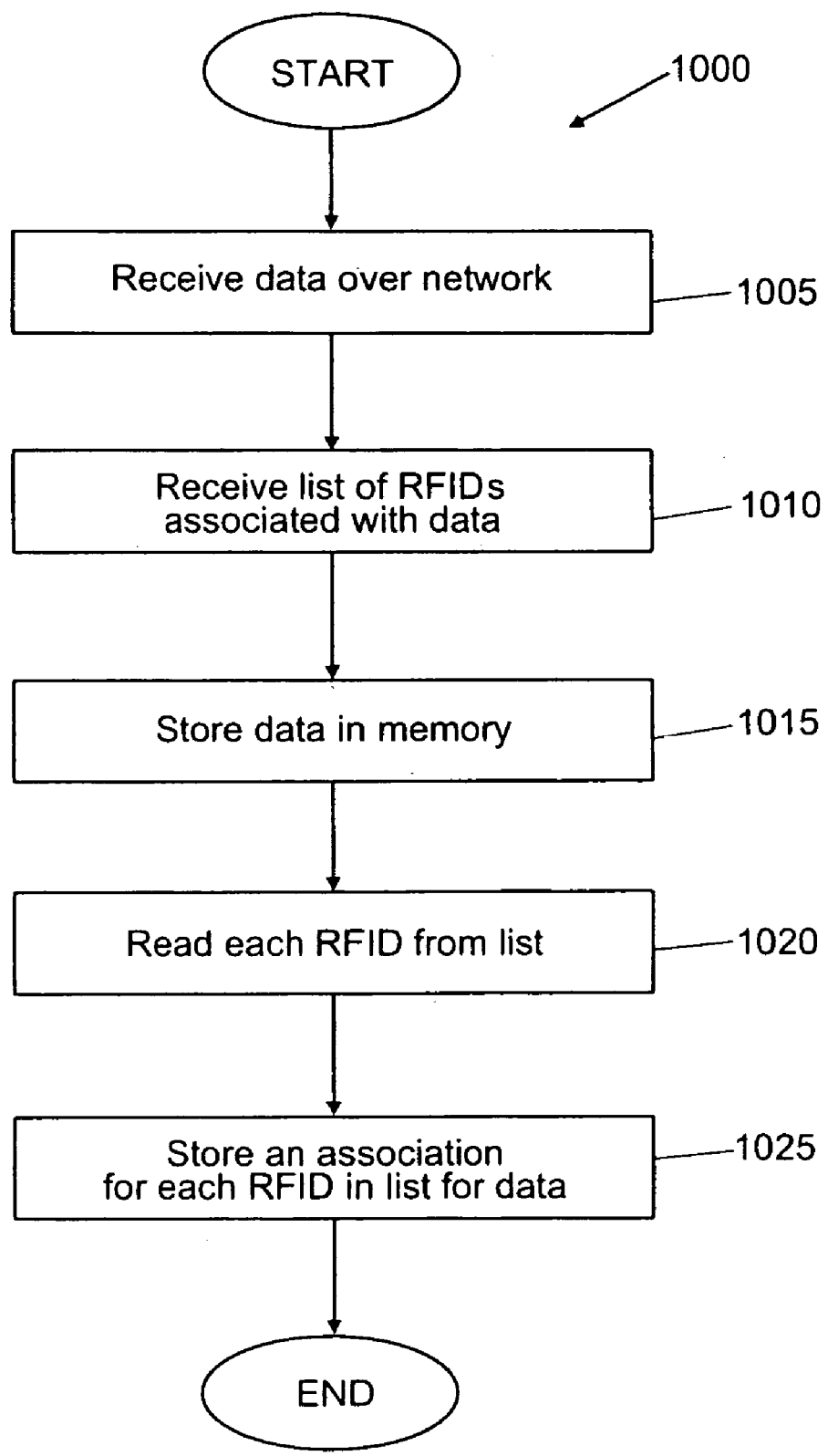
FIG. 10 illustrating a process performed by an archive system for retrieving data associated with a received identification of an RFID device in accordance with an exemplary embodiment of this invention.
Figure 11:
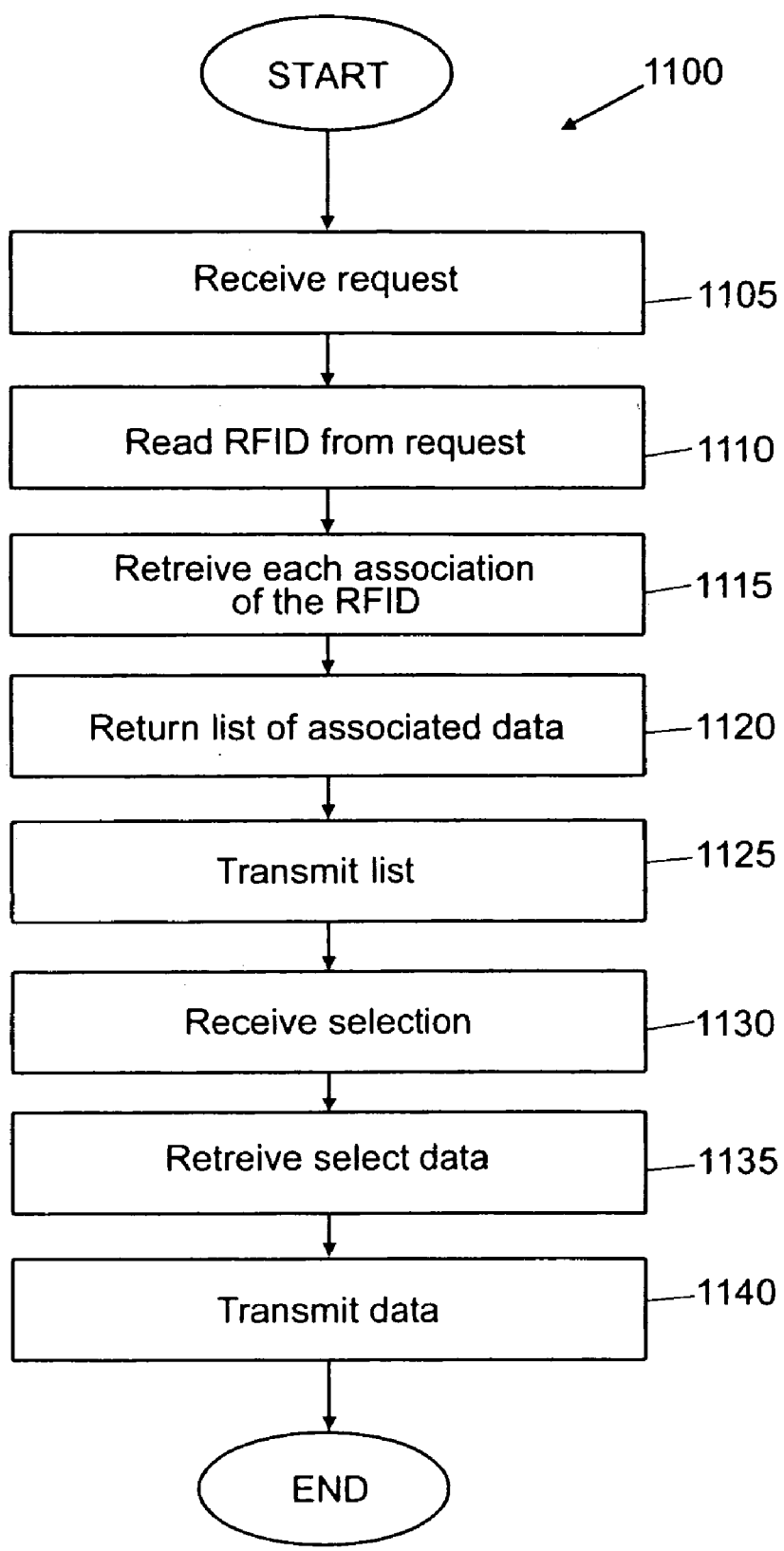
FIG. 11 illustrating a process performed by a processing system connected to the archive system by a network for receiving data associated with an identification of a RFID device.

This invention relates to a system for storing data associated with identifications of RFID devices in an archive system. FIG. 10 illustrates an exemplary process for receiving and storing the data. FIG. 11, on the other hand, illustrates an exemplary process for retrieving of data based upon an identification of an RFID device.

Process 1000, illustrated in FIG. 10, is an exemplary process for receiving and storing data performed by an archive system. Process 1000 begins in step 1005 with the archive system receiving the data over a network. In step 1010, the archive system receives a list that includes identifications of RFID devices associated with the data. One skilled in the art will recognize that steps 1005 and 1010 may occur simultaneously as when the RFID information is stored in a meta data of a file as described above.

In step 1015, the archive system stores the data in a memory. This may be completed in the exemplary embodiment by storing the image file to memory. In step 1020, the archive system reads each identification of an RFID device from the list. In step 1025, the archive system then stores an association of the data with the identification. In some embodiments, this may be implemented by maintaining a database having records for identifications of each RFID device. The address or file name where the data is stored in memory is added to the record of each identification of an RFID device associated with the data. In other embodiments, it is envisioned that a data structure for each identification may be instantiated where the data structure includes a linked list of identifiers for associated data. After all of the associations are stored process 1000 ends.

Process 1100 is an exemplary process executed by an archive system for retrieving data associated with an identification of a RFID device. Process 1100 begins in step 1105 with the archive system receives a request for data. The request includes an identification of an RFID device. One skilled in the art will recognize that the request may be received as a transmission over the network or as an input by an I/O device directly into the archive system.

In step 1110, the archive system reads the identification in of the RFID device from the request. The archive system then determines each association of the identification with data in step 1115. This may be done in some embodiments by reading the associations from a record for the identification stored in a database. In other embodiments, step 1115 is performed by retrieving a data structure from memory for the identification that includes all of the associations of data with the identification.

In some embodiments, the archive system then returns a list of data associated with the identification in step 1120. For example, more than one image may be associated with an identification of a RFID device in the exemplary embodiment and the archive system returns a list of the images associated with the identification of the RFID device. The list is then transmitted or displayed to a user in step 1125. In other embodiments, the archive system may simply retrieve all data on the list.

In the preferred embodiment, this may include a thumbnail file or such representation that is presented to the user to view the data. The archive system then receives a selection of data from the list in 1130 and retrieves the selected data in step 1135. In the exemplary embodiment, the archive system receives a selection of an image and retrieves the file for the image. The retrieved data is then either transmitted or in some other way presented to the user in step 1140 and process 1100 ends.

Figure 12:
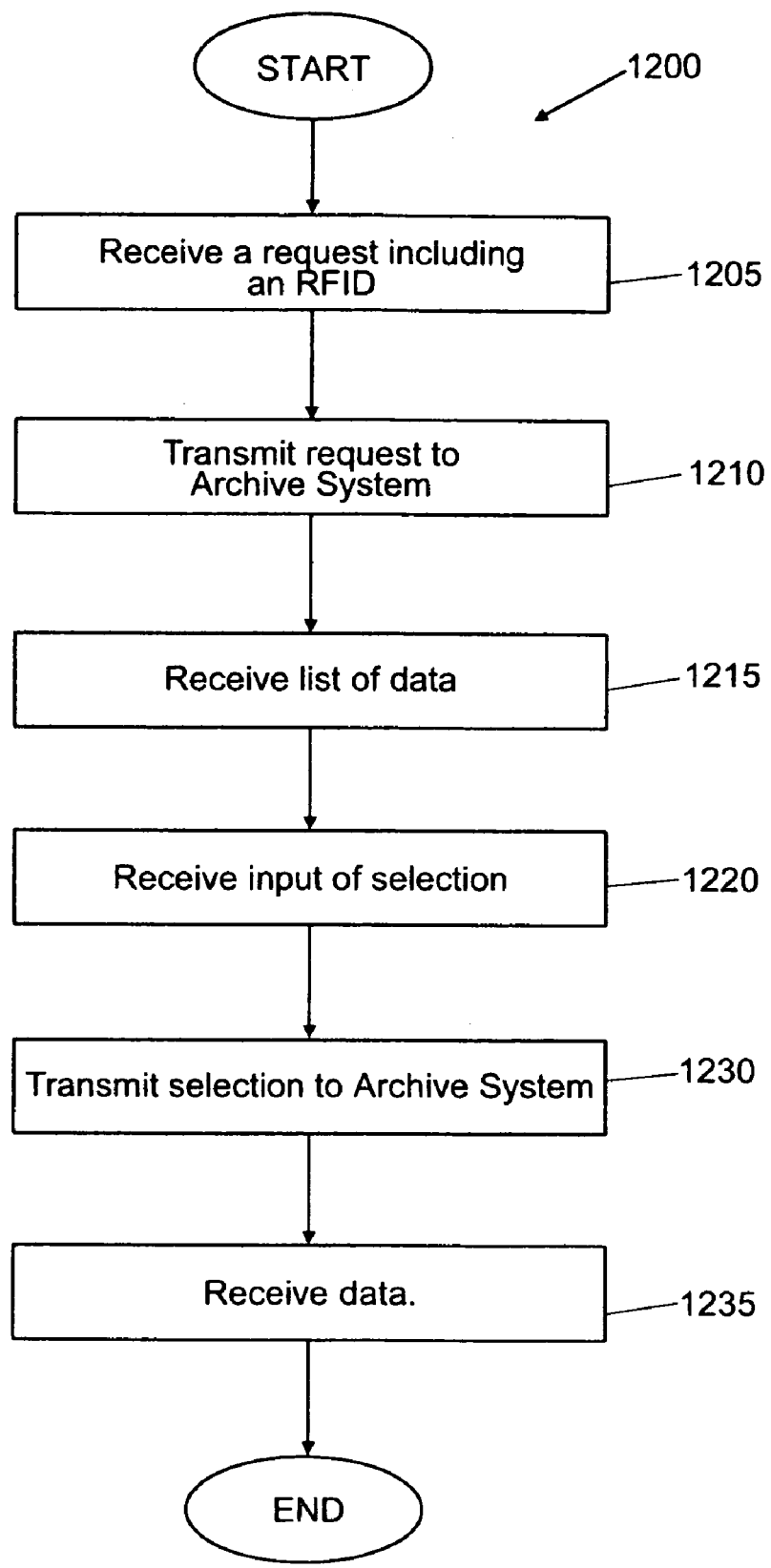
FIG. 12 illustrating a process executed by a requesting device to retrieve data for a user based upon an identification of a RFID.

FIG. 12 illustrates a process 1200 executed by a requesting device to retrieve data for a user based upon an identification of a RFID. Process 1200 begins in step 1205 by receiving a request with an identification of a RFID. This may be received by input from the user from an I/O device or may be performed by a RFID reader that receives an identification of a RFID device proximate the reader. In step 1210, the system transmits the request to the archive system.

In step 1215, the system then receives a list of data associated with the RFID. In the exemplary embodiment, this list would include all of the images which include the identification of the RFID device in the meta data. The user then inputs a selection of data in step 1220. The system then transmits the selection to the archive system in step 1230. The data is then presented to the user in step 1235 and process 1200 ends. In the exemplary embodiment, step 1235 is performed by printing a picture of the image or by electronically transmitting the digital image to the user.

The above are exemplary embodiments of this invention. It is envisioned that those skilled in the art can will design alternatives of this invention as set forth in the claims below either literally or through the Doctrine of Equivalents.

What is claimed is:

1. A method comprising:
receiving from a data capture system a plurality of identifiers, each identifying one of a plurality of RFID devices proximate to a scene, wherein each of the plurality of identifiers is acquired from a respective one of the plurality of RFID devices;
receiving from the data capture system a first data representing the scene, the first data not being received from any of the plurality of RFID devices; and
storing, in the archive system that communicates with the data capture system over a computer network, a data structure representing an association between the first data and the plurality of identifiers, whereby the first data is retrievable based on at least one of the plurality of identifiers, wherein the data structure comprises:
a data portion comprising the first data representing the scene and received from the data capture system; and
a metadata portion comprising a plurality of sub-portions, each sub-portion corresponding to one of the plurality of RFID devices proximate to the scene, wherein each sub-portion comprises an identifier of the respective RFID device and at least one of a location of the respective RFID device in the scene and a global positioning system (GPS) location of the RFID device.

2. The method of claim 1, where the data capture system is a digital camera and where the first data is a digital image.

3. The method of claim 2, where the data capture system provides the digital image and the RFID identifier in a file.

4. The method of claim 3, where the digital image is stored in a data portion of the file and where the RFID identifier is stored in a metadata portion of the file.

5. The method of claim 2, where the data structure is a database record and where the method includes storing the database record to persist an association between the first data and the plurality of RFID devices.

6. The method of claim 1, further comprising:
storing in the archive system a global positioning system (GPS) location of at least one of the RFID devices;
receiving from a requesting system a request for data associated with a requested RFID device, where the request includes an RFID device identifier;
providing to the requesting system from the archive system a set of associations having the RFID device identifier, where the request system is a separate system that communicates with the archive system over a computer network; and providing to the requesting system from the archive system at least one of: (i) the location of the at least one RFID device in the scene and (ii) the GPS location of the at least one RFID device.

7. The method of claim 6, the request being a database query.

8. The method of claim 2, including controlling the image capture system to acquire an image of the scene, in which an item tagged with an RFID device appears.

9. The method of claim 8, the scene being one of, a location in an amusement park, and a sports stadium.

10. The method of claim 6, comprising identifying a digital image associated with a member of the set of associations having the RFID device identifier and providing the digital image.

11. An apparatus comprising:
- an RFID capture device to capture a plurality of identifiers, each identifying one of a plurality of RFID devices proximate to a scene, wherein each of the plurality of identifiers is acquired from a respective one of the plurality of RFID devices;
- a data capture device to capture a first data representing the scene, the first data not being acquired from any of the plurality of RFID devices; second data being acquired from the RFID device;
- a correlation device to produce a data structure representing an association between the first data and the plurality of identifiers, whereby the first data is retrievable based on at least one of the plurality of identifiers, wherein the data structure comprises:
  - a data portion comprising the first data representing the scene and received from the data capture system; and
  - a metadata portion comprising a plurality of sub-portions, each sub-portion corresponding to one of the plurality of RFID devices proximate to the scene, wherein each sub-portion comprises an identifier of the respective RFID device and at least one of a location of the respective RFID device in the scene and a global positioning system (GPS) location of the RFID device; and
- a data store to store the plurality of identifiers, the first data, and the data structure.

12. The apparatus of claim 11, the data capture device being a digital camera and the first data being a digital image.

13. The apparatus of claim 12, wherein the data store further stores a global positioning system (GPS) location of at least one of the RFID devices, and wherein the apparatus further comprises:
- an image display device to selectively display an output digital image in response to receiving a request that includes an RFID identifier and based on at least one of: (i) the location of the at least one RFID device in the scene and (ii) the GPS location of the at least one RFID device, the output digital image being related to the RFID identifier by the data structure.

14. The apparatus of claim 11, the data capture device being a sound recording apparatus and the first data being a sound recording.

15. The apparatus of claim 14, comprising a sound production device to selectively produce an output sound in response to receiving a request that includes an RFID identifier, the output sound being related to the RFID identifier by the correlation data.

16. The apparatus of claim 11, the data structure being a database record.

17. The apparatus of claim 11, the data capture device being controlled to acquire data when an RFID device enters the scene which is covered by the data capture device.

18. The apparatus of claim 17, the scene being located at one of, an amusement park, an attraction, a stadium, a theater, a hall, an office, and an office.

* * * * *

UNITED STATES PATENT AND TRADEMARK OFFICE
CERTIFICATE OF CORRECTION

| | | |
|---|---|---|
| PATENT NO. | : 7,840,450 B2 | |
| APPLICATION NO. | : 11/142921 | |
| DATED | : November 23, 2010 | |
| INVENTOR(S) | : Brahmbhatt et al. | |

It is certified that error appears in the above-identified patent and that said Letters Patent is hereby corrected as shown below:

In the Claims:

Column 9, Claim 11, Lines 27-28, please delete "second data being acquired from the RFID device;".

Signed and Sealed this
Twenty-second Day of March, 2011

David J. Kappos
*Director of the United States Patent and Trademark Office*